United States Patent [19]

Vaidya

[11] Patent Number: 4,670,871

[45] Date of Patent: Jun. 2, 1987

[54] RELIABLE SYNCHRONOUS INTER-NODE COMMUNICATION IN A SELF-ROUTING NETWORK

[75] Inventor: Avinash K. Vaidya, Naperville, Ill.

[73] Assignee: American Telephone and Telegraph Company, AT&T Bell Laboratories, Murray Hill, N.J.

[21] Appl. No.: 749,500

[22] Filed: Jun. 27, 1985

[51] Int. Cl.⁴ .............................................. H04Q 11/04
[52] U.S. Cl. .......................................... 370/60; 370/94
[58] Field of Search ........................ 370/60, 94, 85, 58, 370/15, 13

[56] References Cited

U.S. PATENT DOCUMENTS

| | | | |
|---|---|---|---|
| 4,314,367 | 2/1982 | Bakka et al. | 370/60 |
| 4,433,411 | 2/1984 | Gefroerer et al. | 370/94 |
| 4,472,801 | 9/1984 | Huang | 370/60 |
| 4,491,945 | 1/1985 | Turner | 370/60 |
| 4,550,397 | 10/1985 | Turner et al. | 370/60 |

*Primary Examiner*—Douglas W. Olms
*Assistant Examiner*—Curtis Kuntz
*Attorney, Agent, or Firm*—John C. Moran

[57] ABSTRACT

A communication method and packet switching network in which self-routing packets are communicated among stages of switching nodes via inter-stage links whereon data of the packets is transmitted in one direction and the packet clocking signals are transmitted in the other direction. Upon having the capability to accept a packet from one of the inter-stage links, a switch node transmits the packet clock signals to the upstream stage connect to that link indicating the present capacity to accept a packet. Furthermore, each switch node after receiving the end of a packet from an upstream stage times for a predefined amount of time before commencing the transmission of the packet clocking signals. That delay allows the transmitting switch node in the upstream stage to determine that the link and the downstream node are functioning correctly since continued transmission of the packet clock signals indicates that the packet had not been received or that downstream node had incorrectly responded to receipt of the packet. If a malfunction is detected, an error indication is transmitted to the computer controlling the switching network. Furthermore, upon receipt of a system reset signal, all switch nodes immediately transmit the packet clock signals to upstream stages; and the switch nodes in the upstream stages transmit the error indication if the packet clock signals are not received over a particular link within the predefined amount of time.

21 Claims, 9 Drawing Figures

| PACKET LENGTH | DEST TRUNK CNTRLR | SOURCE TRUNK CNTRLR | CONTROL | ARRIVAL TIME | PACKET IDENTIFIER | LOGICAL ADDRESS | TIME STAMP | | DATA | CRC |
|---|---|---|---|---|---|---|---|---|---|---|
| | 1011 | 60 | 0 | | 1 | | | 2 | | |

START BIT

FIG. 4

| PACKET LENGTH | DEST TRUNK CNTRLR | SOURCE TRUNK CNTRLR | CONTROL | ARRIVAL TIME | PACKET IDENTIFIER | LOGICAL ADDRESS | TIME STAMP | | DATA | CRC |
|---|---|---|---|---|---|---|---|---|---|---|
| | 0111 | 60 | 0 | | 1 | | | 2 | | |

START BIT

FIG. 5

| PACKET LENGTH | DEST TRUNK CNTRLR | SOURCE TRUNK CNTRLR | CONTROL | ARRIVAL TIME | PACKET IDENTIFIER | LOGICAL ADDRESS | TIME STAMP | | DATA | CRC |
|---|---|---|---|---|---|---|---|---|---|---|
| | 1110 | 60 | 0 | | 1 | | | 2 | | |

START BIT

RELIABLE SYNCHRONOUS INTER-NODE COMMUNICATION IN A SELF-ROUTING NETWORK

TECHNICAL FIELD

This invention relates to a packet switching method and structure architecture for the communication of information packets through a self-routing network. The invention detects malfunctioning links between packet switch nodes and synchronously transfers packet data between interconnected switch nodes.

BACKGROUND OF THE INVENTION

Self-routing networks are well known and are commonly called banyan networks. One such switching network is disclosed in J. S. Turner, U.S. Pat. No. 4,491,945. As disclosed in Turner, the self-routing network comprises a plurality of stages with each stage having a plurality of switch nodes. Within a given stage, a switch node is responsive to the receipt of a packet from an upstream node to examine the routing information contained within the packet and to transfer that packet to the downstream switch node of the subsequent stage as designated by the routing information. In Turner, a complete path is to set up through the switching network before the packet enters the switching network, but rather, a packet is transferred from stage to stage as the designated switch node in the next stage has the capacity to accept the packet. An inter-node protocol is used to facilitate the communication of packets in this manner. In addition, each switch node has the capacity for buffering one complete packet per input terminal and indicates to the upstream node when it is capable of accepting another packet from the upstream node. Turner utilizes a single conductor both to transfer data from the upstream node to the downstream node and for the downstream node to signal the upstream node when the downstream node has the capacity for accepting another packet.

Also, Turner synchronizes the transfer of data between switch nodes by supplying to all the switch nodes of the switching network clock signals that are received by all nodes with identical phase from a common timing generator. Providing the synchronization for the switch nodes in this manner allows Turner to have only one conductor per interconnection link between two switch nodes. In Turner an inter-node protocol functions in the following way. The downstream and upstream node transmit information on the single conductor interconnecting them utilizing tri-state devices. The latter devices exhibit a high-impedance state when not transmitting information. When no information is being transmitted between the two interconnected nodes, both nodes are interrogating the conductor for information. When the downstream node is capable of receiving another packet from the upstream node, the downstream node transmits a capacity available signal to the upstream node on the conductor indicating that the downstream node has the present capacity for receiving another packet. The upstream node is responsive to the received signal to commence the transfer of another packet to the downstream node if a packet is awaiting transmission. The downstream node utilizes the common clock signal to clock the incoming packet data from the upstream node into internal storage registers where the decoding of the routing information can be accomplished for communicating this packet to the next sequential stage.

As disclosed in U.S. Pat. No. 4,314,367, R. Bakka, et al., it is known to transmit clock signals via a second conductor from the transmitting node to the receiving node using yet a third conductor to transfer a capacity-to-receive signal from the receiving node to the transmitting node. That method increases the number of conductors between switch nodes; thus reducing the number of nodes which can be placed on a printed circuit board. This limitation is due to the limited number of connections that can be made to a printed circuit board.

In addition, it is known to encode the data and clock signals together and transmit the resulting self-clocking signal via one conductor. One such self-clocking method is Manchester encoding. The problem with self-clocking methods are that those methods require the utilization of delay lines in both the transmitter and receiver. Delay lines tend to be unreliable and are difficult to fabricate on very large scale integrated circuits (VLSI).

Whereas, the inter-node protocol and synchronization disclosed in Turner works very well in many configurations of self-routing networks and is readily adaptable to VLSI implementation, it does not allow for the detection of the interlink malfunctions either during the transferring of data from the upstream to the downstream node or during the transfer of the capacity available signal from the downstream node to the upstream node. Also, problems can exist in Turner in providing clock signals that have identical phase throughout a large self-routing network. Physical factors can cause the phase of the clock signals to be different at various places in the switching network if a great deal of care is not taken in the distribution of these clock signals.

SUMMARY OF THE INVENTION

In an illustrative method and structural embodiment, a departure in the art is achieved by a switch node that indicates its capacity for receiving a packet from an upstream node by advantageously transmitting clock signals to that upstream node which in turn uses those signals to transfer packet data to the downstream node. In addition, the upstream node detects a malfunctioning inter-node link by monitoring the amount of time before packet clock signals are received from the downstream node after sending a packet to the downstream node. If a predefined amount of time does not elapse before receipt of the packet clock signals, the downstream node indicates an error. Upon a system reset, an upstream node indicates an error after packet clock signals are not received from the downstream node within the predefined amount of time.

The structural embodiment comprises a switch node for use in a packet switching network having a plurality of stages each having a number of the switch nodes for communicating packets. The switch nodes each have input circuits that are connected to the upstream stage by links and output circuits that are connected to the downstream stage by links. When an input circuit has the present capacity to receive a packet from the upstream stage, the input circuit transmits packet clocking signals to the upstream stage indicating the present capacity to receive a packet. The input circuit is responsive to a packet from the upstream stage to internally store that packet and transmit to the output circuit designated by the routing information within the packet a request for the output circuit to communicate the received packet to the downstream stage. An output circuit is responsive to a request from an input circuit and receipt of packet clock signals from the downstream stage to communicate the packet to the downstream stage.

Advantageously, the input circuit is responsive to the end of the packet from the upstream stage to cease transmitting packet clock signals for a predefined amount of time thereby allowing the upstream stage to verify the correct operation of the input circuit and the interconnecting link. Since after sending the end of the packet, an output circuit times to make certain that no packet clock signals are received for a predefined amount of time. If clock signals are received before the end of this predefined amount of time, the output circuit generates an error signal since the downstream input circuit has either malfunctioned or the link has malfunctioned with respect to transferring data to the downstream node.

Advantageously, to further ascertain the correct operation of a switching network utilizing the switch nodes, a switch node, upon receipt of a system reset signal, immediately discards all stored packets and commences to transmit the packet clock signals to the upstream stage. Anticipating this operation in the downstream stage, the output circuits of the switch node are responsive to the system reset signal for generating the error signal if packet clock signals are not received from the downstream stage within a predefined amount of time.

In addition, the problems associated with synchronizing the communication of packet data over large physical distances between switch nodes is resolved by a synchronization circuit in each output circuit. Each switch node utilizes for internal fundamental timing purposes, system clock signals that are generated by a single timing generator for the whole switching network. However, because of physical distance, the phase of the system clock signals may be different at various switch nodes. The synchronizing circuit resolves this problem by synchronizing the transfer of the signals with respect to the packet clock signals coming from the downstream node. The synchronizing circuit illustratively consists of a plurality of individual flip-flops used to store the data bits which make up the packets and a directing circuit which sequentially, in response to system clock signals, stores the incoming packet data from the input circuit into the flip-flops. A sequential reader circuit is used sequentially to read the packet data bits from the flip-flop utilizing a differing sequence than that used to store the data bits, and that circuit is controlled by the packet clock signals being received from the downstream stage.

The directing circuit illustratively consists of a modulo 3 counter that is responsive to the system clock and a multiplexer controlled by the contents of the modulo 3 counter for steering the packet data bits to the flip-flops. Each flip-flop has a data and a clock input terminal, and the packet data bits are steered to the data input terminals by the multiplexer. Another multiplexer, also controlled by the modulo 3 counter, is used to steer the system clock signals to the clock input terminals of the flip-flop in the same sequence as the packet data bits are steered to the data input terminals of the flip-flops.

The reader circuit for reading the packet data bits illustratively comprises a data selector controlled by another modulo 3 counter that is responding to the packet clock signals from the downstream stage.

The illustrative method functions with a switching network having a plurality of stages each having a plurality of switch nodes. Each of the packets has address routing information, and each switch node has input circuit and output circuits. The switching network has a number of inter-stage links that interconnect individual output circuits of an upstream switch node to an individual input circuit of a downstream switch node. The method performs the following steps in transferring a packet from an upstream node to a downstream node: generating packet clock signals by one of the input circuits of a downstream node for transmission to the upstream node when the downstream node has the present capacity to receive a packet, transferring a packet in response to a receipt of packet clock signals by an upstream switch node to the downstream switch node, timing for a predefined amount of time by the transmitting upstream switch node at the end of the transmission of the packet and transmitting error information by the upstream switch node in response to receipt of packet clock signals from the downstream switch node within the predefined amount of time.

In addition, the switching network has associated with it a system processor capable of generating a system reset signal, and the method further comprises the steps of: regenerating said packet clock signals by the downstream input means upon receipt of the system reset signal and retransmitting the error information by the upstream output circuit upon elapse of the predefined amount of time and the receipt of the system reset signal.

BRIEF DESCRIPTION OF THE DRAWING

In general, system elements, when first introduced on a figure, are each designated with a number that uses the figure number as the most significant digits of the element number.

DETAILED DESCRIPTION

Figure 1:
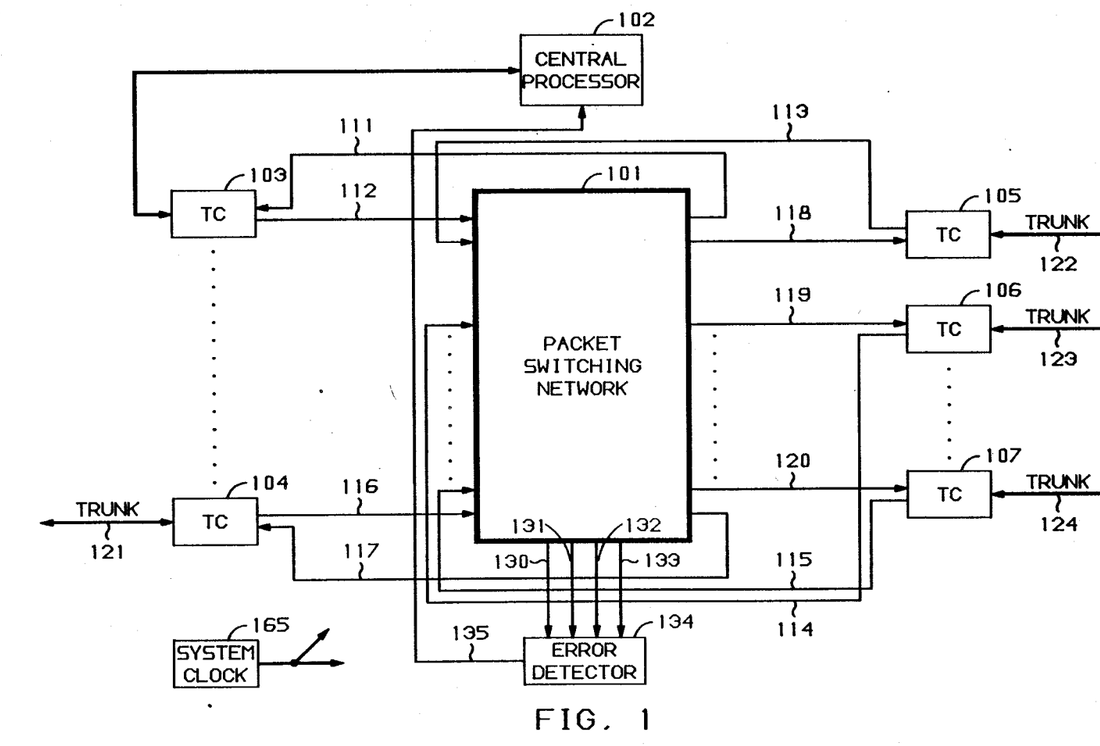
FIG. 1 illustrates in block diagram form, a packet switching system utilizing the switch node of the present invention.

FIG. 1 illustrates a packet switching system for switching packets from an originating trunk controller such as trunk controller 104 to a destination trunk controller such as trunk controller 107. Packet switching network 101 comprises a plurality of switching stages, which ilustratively may be four, and each switching stage has a plurality of switch nodes. Each switch node is interconnected to two nodes in the downstream stage by means of two individual links. Each individual link consists of two conductors. The first conductor is utilized by the downstream switch node to transmit clock signals to the upstream node when the downstream node has the capacity for accepting a packet from the upstream node. When the upstream node has a packet to transmit, it utilizes the clock signals to transfer the packet to the downstream node. An inter-stage protocol is utilized to detect the malfunction of a downstream node or the malfunction of the inter-stage link. If a node within a stage detects the malfunctioning of a downstream node or the inter-stage link, it communicates this information to error detector circuit 134. For example, a downstream node in the second stage transmits an error signal via conductor 131. Error detector circuit 134 is responsive to the receipt of the error signal on conductor 131 to transmit the fact that an error has occurred in the second stage via bus 135 to central processor 102. The latter processor is responsive to the error report to execute the necessary maintenance functions to identify the error with greater precision.

Figure 2:
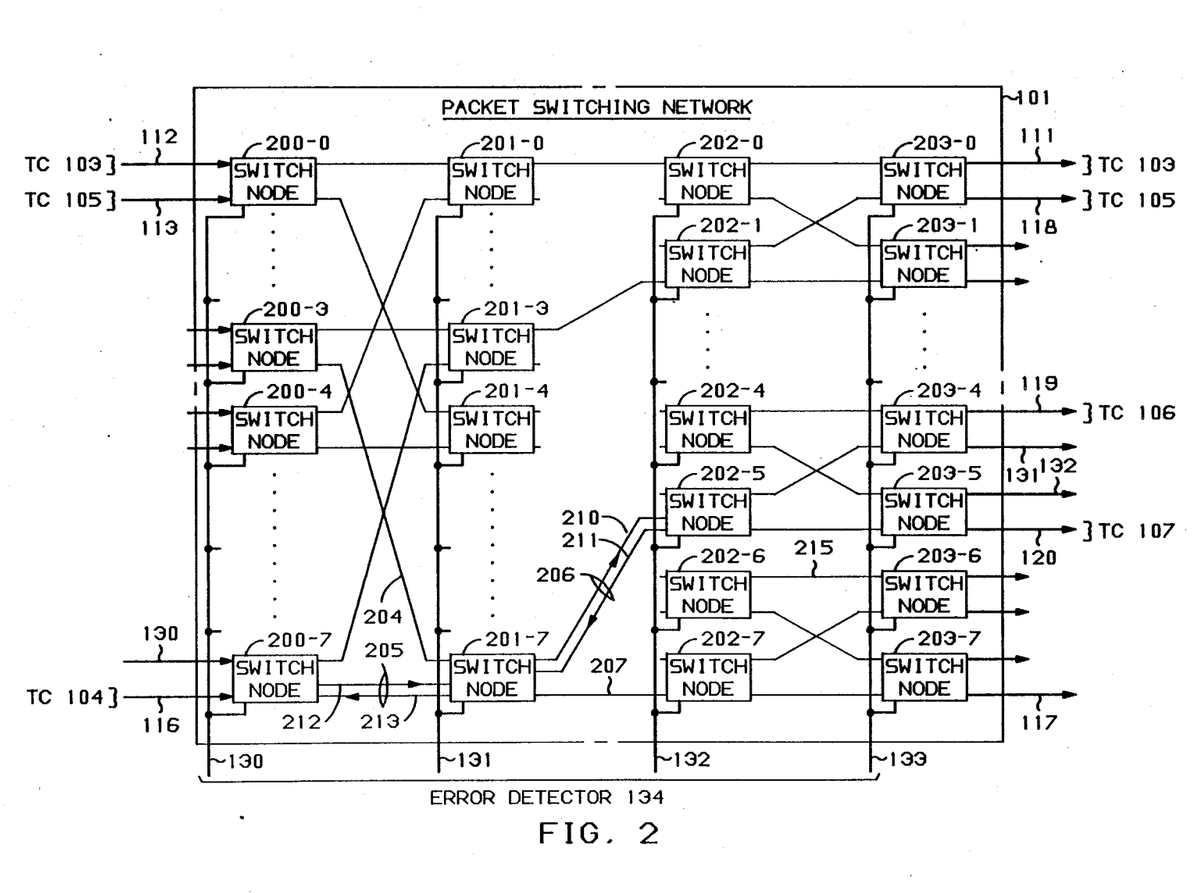
FIG. 2 is a detailed block diagram of switching network 101 of FIG. 1.

Packet switching network 101 is illustrated in greater detail in FIG. 2. An illustrative switch packet is shown in FIG. 3 and contains in its destination trunk controller field the routing information necessary to route the packet through packet switching network 101 as illustrated in FIG. 2.

Figure 3:
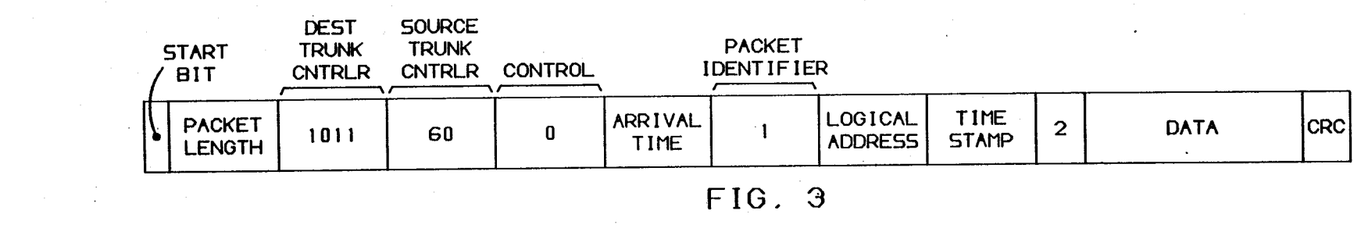
FIGS. 3 through 6 illustrate the contents of a switch packet as it is transmitted from trunk controller 104 to trunk controller 107 through packet switching network 101.
Figure 4:
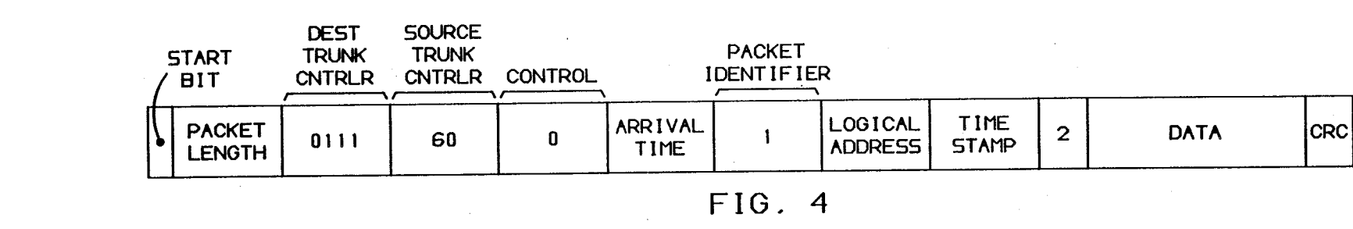
Figure 5:
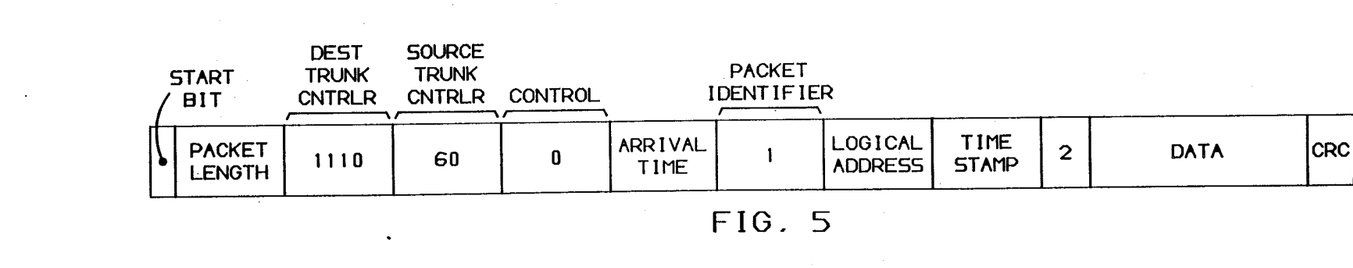
Figure 6:
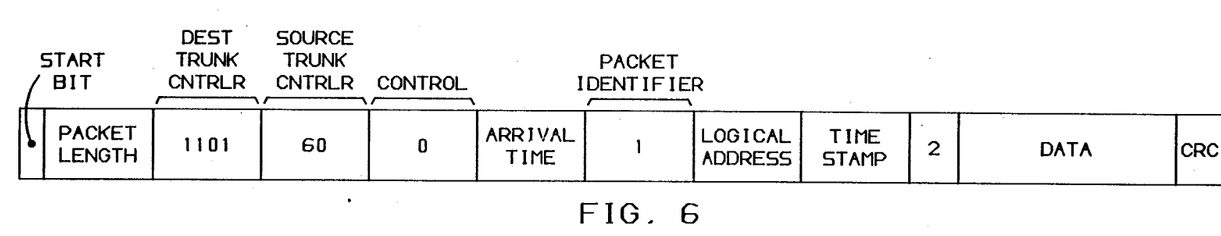

The operation of switching network 101 can be better understood by considering the example of switching the packet illustrated in FIG. 3 from trunk controller 104 to trunk controller 107. Node 200-7 is responsive to the packet illustrated in FIG. 3 being received on input link 116 to interrogate the most significant bit of the destination trunk controller field. Since the most significant bit is a "1", node 200-7 communicates this packet to node 201-7 via output link 205. Before communicating the packet to node 201-7, node 200-7 performs a left rotation on the destination trunk controller field resulting in the field illustrated in FIG. 4. Node 201-7 is responsive to the packet illustrated in FIG. 4 to communicate that packet to node 202-5 via output link 206 since the most significant bit of the destination trunk controller field illustrated in FIG. 4 is a "0" designating that the packet be communicated via the upper output link of node 201-7. Before communicating the packet to node 202-5, node 201-7 performs a left rotation on the destination trunk controller field resulting in the field illustrated in FIG. 5. Node 202-5 is responsive to the packet illustrated in FIG. 5 to communicate this packet to node 203-3 via output link 215 since the most significant bit of the destination trunk controller field is a "1". Before transmission of the packet illustrated in FIG. 5 to node 203-5, node 202-5 rotates the destination trunk controller field resulting in the packet illustrated in FIG. 6. Node 203-5 is responsive to the packet illustrated in FIG. 6 to communicate this packet to trunk controller 107 via output link 120 since the most significant bit of the destination trunk controller field is a "1".

Consider how the inter-stage protocol functions by the following example of the transmission of the packet illustrated in FIG. 4 from switch node 201-7 to switch node 202-5. Upon receiving the packet from switch node 200-7, switch node 201-7 stores this packet in an internal buffer until it can communicate the packet to switch node 202-5. To determine when the packet can be communicated, switch node 201-7 tests conductor 211 of link 206 for clock signals being transmitted from switch node 202-5. When the transmission of clock signals is detected via conductor 211 indicating that switch node 202-5 has the capacity to accept the packet, switch node 201-7 utilizes these clock signals to synchronize the transfer of the packet data stored internally to switch node 202-5 via conductor 210 of link 206. When switch node 202-5 receives the end of the packet, as determined by the packet length field of FIG. 5, switch node 202-5 ceases to transmit clock signals via conductor 211 to switch node 201-7 for a predefined amount of time. In order to assure that the link 206 is properly functioning and that switch node 202-5 is properly functioning, switch node 201-7 performs the following operations. After switch node 201-7 has transferred the packet to switch node 202-5, it times for the predefined period to assure no transmission of the clock signals via conductor 211. If these clock signals are received within the predefined time period, switch node 201-7 transmits a signal via conductor 131 to error detector 134 indicating that either link 206 has failed or that switch node 202-5 is failing.

Figure 7:
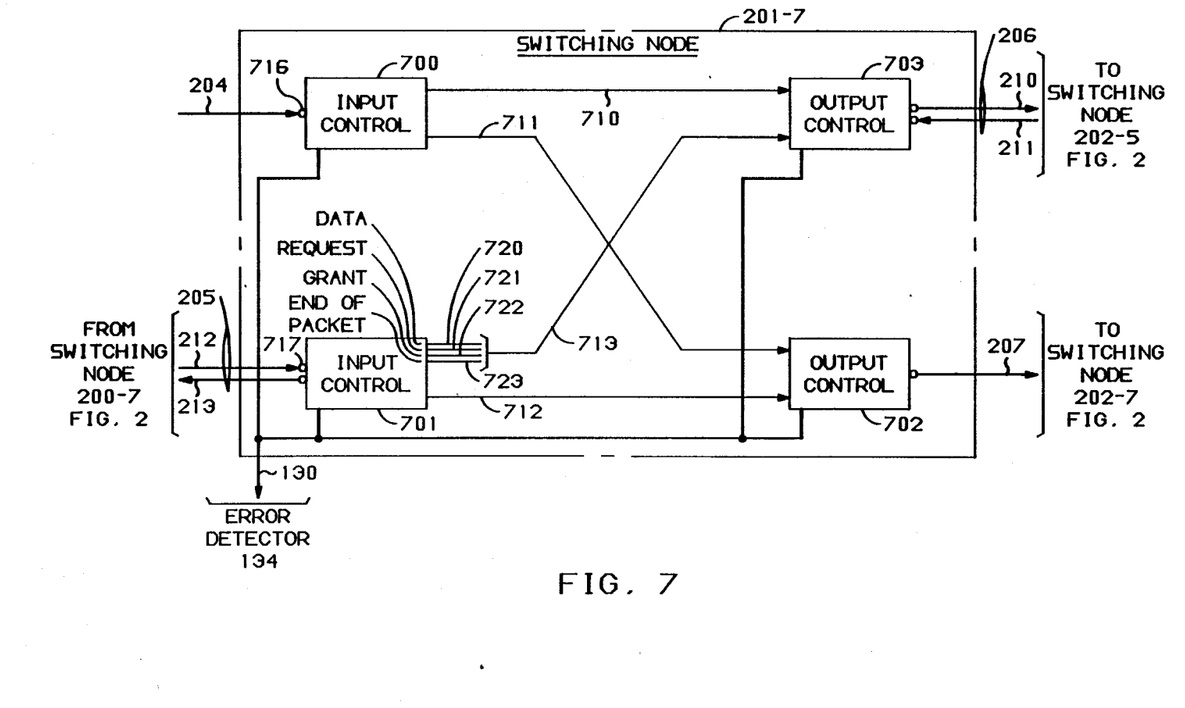
FIG. 7 is a detailed block diagram of switch node 201-7 of switching network 101.

Switch node 201-7 is illustrated in greater detail in FIG. 7. The other switch nodes are identical in design to switch node 201-7. The switch node consists of two input controls that can transmit packet information to either of the two output controls. The input controls 700 and 701 are connected to the output controls 702 and 703 via cables. For example, input control 701 is connected to output control 703 via cable 713. Cable 713 comprises four conductors, 720 through 723. The other interconnecting cables in FIG. 7 are identical in design to cable 713. When input control 701 is capable of accepting another packet from switch node 200-7, input control 701 transmits clock signals via conductor 213 of link 205 to switch node 200-7.

For example, upon receipt of the packet illustrated in FIG. 4, input control 701 transmits to output control 703 a request signal via conductor 721. Even after receiving a grant signal from output control 703, input control 701 continuously transmits this request signal until the entire packet has been transmitted to output control 703. When output control 703 is receiving clock signals via conductor 211 from switch node 202-5, output control 703 transmits the grant signal via conductor 722 to input control 701. Upon receipt of the grant signal, input control 701 commences to transmit the packet to output control 703 via conductor 720.

Figure 8:
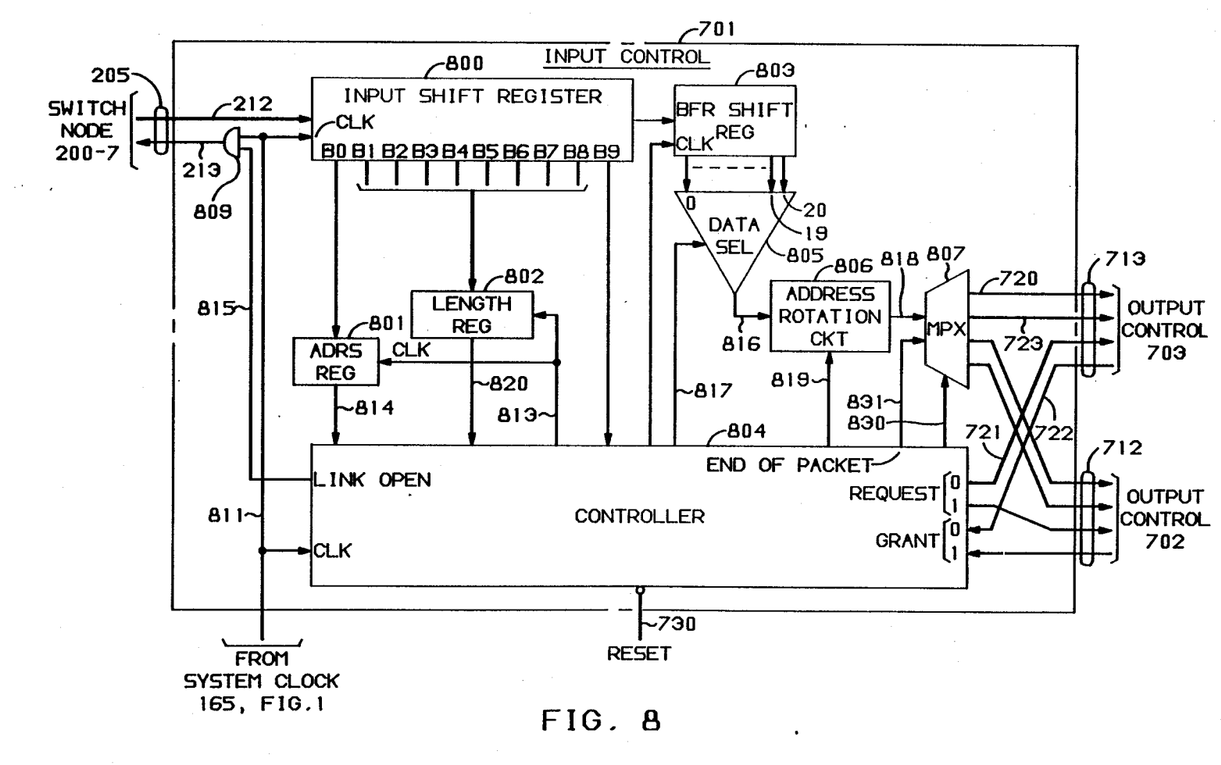
FIG. 8 is a detailed block diagram of input control 701 of switch node 201-7 of FIG. 7.

Input control 701 is shown in greater detail in FIG. 8. Information transmitted from node 200-7 via conductor 212 is initially clocked into input shift register 800. Gate 809 controls the transmission of clock signals to node 200-7 via conductor 213. The manner in which gate 809 is controlled is explained in greater detail, with respect to the discussion of FIG. 9. Input shift register 800 is used to detect the start bit that indicates the beginning of the packet. In addition, input shift register 800 is used to extract the network packet length field, that is saved in length register 1 802. Also, the most significant bit of the destination trunk controller field is extracted utilizing input shift register 800 and this latter bit is stored in address register 801 where controller 804 interrogates this bit via conductor 814. Buffer shift register 803 is capable of buffering one complete packet. Buffer shift register 803 provides an output after each 64 bits of storage. These outputs are selected by data selector 805 under control of controller 804, to bypass unused portions of the buffer shift register 803. This bypassing is done when it is not necessary to buffer a whole packet before transmission of a packet can start to the output circuit and is done to speed up the transfer of a packet through input control 701. Address rotation circuit 806 performs the previously mentioned left rotate operation on the destination trunk controller field before this field is transmitted with the remainder of the packet to the selected output control. Multiplexer 807 under control of controller 804 selects width of the cables 713 or 712 the data from circuit 806 and end-of-packet signal from controller 804 to be transmitted on.

The operation of input control 701 will now be further explained by using the previous example which dealt with the transmission of the packet shown in FIG. 4. Input shift register 800 is continuously being clocked by system clock 165 via conductor 811. As data is received via conductor 212, it is clocked through input shift register 800. Once the start bit reaches bit position 9 of input shift register 800, controller 804 detects this bit and transmits a pulse on conductor 830. This pulse causes length register 802 to store the packet length field and causes address register 801 to store the most significant bit of the destination trunk controller field, which is contained in bit position O of input shift register 800.

Controller 804 transmits a request via conductor 721 to output control 703 since the most significant bit of the destination trunk controller field of the packet illustrated in FIG. 4 indicates that the packet is to be transmitted to this output control. While this request is being made, data is being shifted from input shift register 800 to buffer shift register 803 which has a number of output terminals. These output terminals are connected to different bit positions within buffer shift register 803. When controller 804 receives a grant signal from output control 703, via conductor 722, controller 804 calculates at which output of buffer shift register 803 the start bit of the packet is approaching within buffer shift register 803. This is done so that transmission of the packet to output control 807 can start as soon as possible. On the basis of this calculation, controller 804 controls data selector 805 to select the designated output of buffer shift register 803. The control information is transmitted to data selector 805 via cable 817. Data selector 805 transmits the data from the selected output to address rotation circuit 806 via conductor 816. Before transmitting data, controller 804 resets address rotation circuit 806 by transmitting the start of packet signal via conductor 819. Controller 804 also properly conditions multiplexer 807 via bus 830 to direct the output of the address rotation circuit 806 that is being transmitted via conductor 818 and the end-of-packet signal on conductor 831 to output control 703 via conductors 720 and 723, respectively. The end-of-packet signal transmitted on conductor 831 designates when the last bit of the packet is being transmitted from multiplexer 807. Controller 804 calculates when the last bit is being transmitted from multiplexer 807 by using the contents of length register 802 to determine when all the bits of the packet have been processed by input control 701.

The controller 804 uses the packet length information stored in length register 802 which it reads via cable 820, to determine when the end of the packet has entered the input shift register. When this occurs and transmission has started from shift register 803, controller 804 waits for 5 clock pulses on conductor 811 and, then, transmits a signal continuously via conductor 815. That signal controls gate 809 so that the clock signals transmitted via conductor 811 are continuously transmitted to node 200-7 via conductor 213. The transmission of these signals via conductor 213 indicates to switch node 200-7 that input control 701 is ready to receive another packet. The reason for delaying the transmission of clock signals to switch node 200-7 for 5 clock pulses is so that switch node 200-7 can determine whether or to link 205 and node 201-7 are functioning properly. More detail, with respect to how this determination is performed, is given in the next section dealing with FIG. 9.

Figure 9:
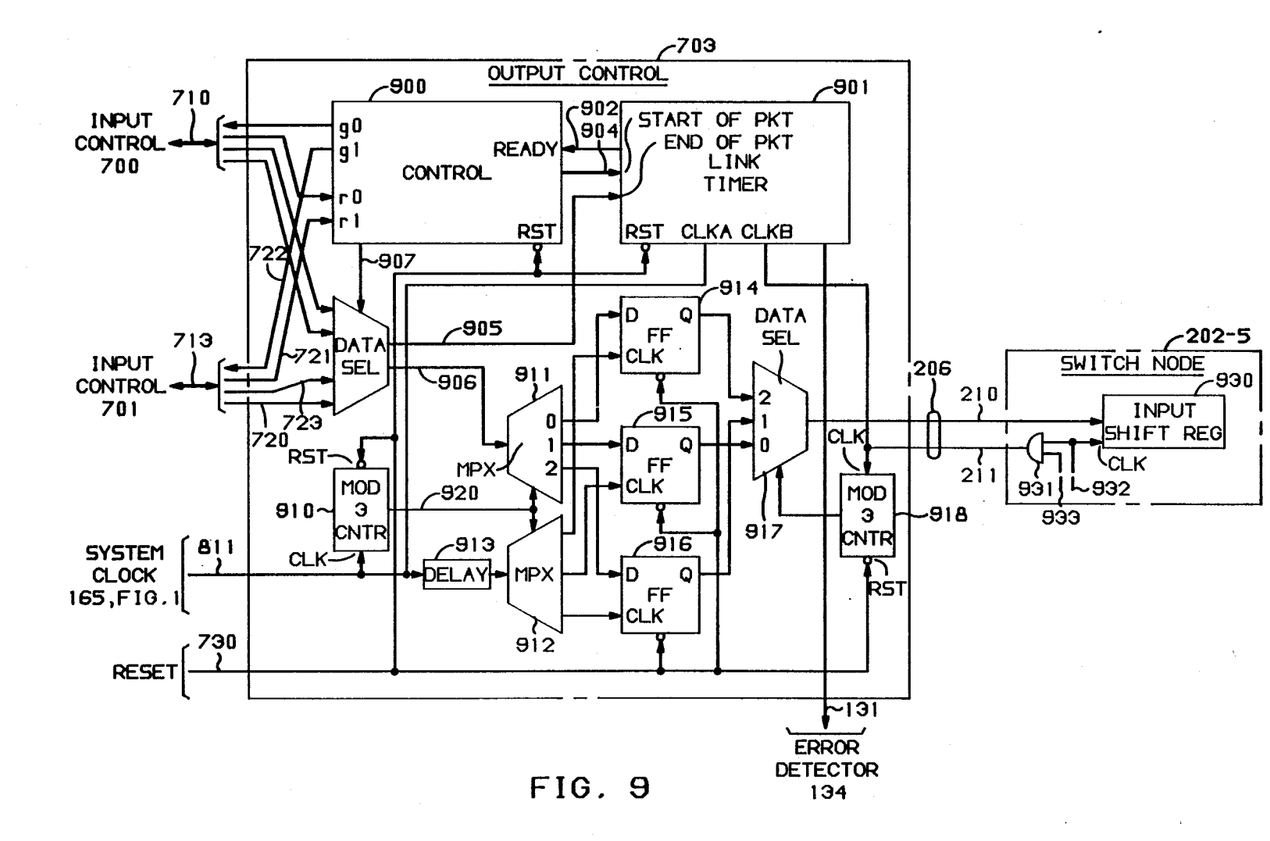
FIG. 9 is a detailed block diagram of output control 702 of switch node 201-7 of FIG. 7.

Output control 703 of FIG. 7 is illustrated in greater detail in FIG. 9. Control circuit 900 responds to requests from input controls 700 and 701 that are transmitted via cables 710 and 713. If link timer 901 is receiving clock signals from switch node 202-5, it transmits a ready signal via conductor 902 to control 900 indicating that output control 703 can transmit a packet to switch node 202-5. In response to the ready signal on conductor 902, control circuit 900 responds to a request by transmitting a grant signal back to the requesting input control via one of the above-mentioned cables. After acknowledging the request, control circuit 900 conditions data selector 903 to select the data conductor and end-of-packet signals from the appropriate cable 710 or 713 by transmitting the appropriate control information to data selector 903 via cable 907. Data selector 903 transmits the data information received on the selected input terminal to conductor 906. The resynchronization circuit of output controller 703 which comprises elements 910 through 918 is responsive to data on conductor 906 to transfer this data to switch node 202-5 via conductor 210.

The operation of output control 703 as shown in FIG. 9, will now be explained in greater detail by considering the previous example of input control 701 transmitting a packet of data to output control 703 via cable 713. When input control 701 transmits the request signal via conductor 721, control circuit 900 transmits the grant signal to input control 701 via conductor 722 if control 900 is receiving the ready signal via conductor 902 from link timer 901. Assuming that the ready signal is being transmitted from link timer 901, control 900 transmits the grant signal to input control 701 and conditions data selector 903 via conductor 907 to transfer the states of conductors 723 and 720 to conductors 905 and 906, respectively. In addition, control 900 transmits a start signal via conductor 904 to link timer 901. As the data is received from input control 701 via conductor 720, data selector 903 and conductor 906, the resynchronization circuit transfers this data to switch node 202-5 via conductor 210. As previously described, when input control 701 determines that the last bit of the packet has been transmitted via conductor 720 it transmits the end-of-packet signal to output control 703 via conductor 723. Link timer 901 is responsive to the end-of-packet received via data selector 903 and conductor 905 to wait 3 clock pulses as determined by the clock A input and, then, to interrogate conductor 211 for 3 more additional clock pulses as determined by the clock A input. If link timer 901 detects clock pulses on conductor 211 during those latter three clock pulses, it transmits an error signal via conductor 131 to error detector 134 indicating that link 206 or switch node 202-5 is malfunctioning. The reason that an error is indicated in this manner is that when switch node 202-5 determines that the last bit of the packet has been received in input shift register 930, switch node 202-5 inhibits the transmission of clock signals via conductor 211 as was previously described, with respect to input control 701.

Another mechanism for link timer 901 detecting a malfunction of link 206 or switch node 202-5 is during a system reset. When a system reset occurs, all packets waiting trnasmission within buffers of all input control circuits in switching network 101 are discarded. Hence, all switch nodes of switching network 101 have the present capacity to receive a packet from an upstream node. Because of that fact, after a system reset is received via conductor 730 from system clock 165, link timer 901 times for 5 clock pulses as determined by clock A input and, then, interrogates the state of conductor 211 for clock signals. If no clock signals are found on conductor 211, it indicates that conductor 211 is malfunctioning or switch node 202-5 is malfunctioning. In either case, link timer 901 transmits an error signal via conductor 131 to error detector 134.

Consider now, the operation of the resynchronization circuit which consists of elements 910 through 918. The purpose of the resynchronization circuit is to compensate for any differences in the phase of the clock signals generated by the system clock 165 as received by switch node 201-7 and switch node 202-5. This resynchronization is accomplished by the manner in which the input data received on conductor 906 is loaded into flip-flops 914 through 916 and how that data is extracted from those flip-flops and transmitted via conductor 210 to switch node 202-5. As the incoming data on conductor 906 is being stored in flip-flop 914, the data previously stored in 915 is being transmitted by data selector 917 via conductor 210. Then, as the data is being stored from conductor 906 into flip-flop 915, the data contained in flip-flop 916 is being extracted and transmitted by data selector 917 via conductor 210 to switch node 202-5.

Data from conductor 906 is stored in flip-flops 914, 915, and 916 in the following manner. Under control of clock pulses received from system clock 165 via conductor 811, counter 910 (which is a modulo 3 counter) counts in the following sequence: zero, one, two, and then repeats. This information from counter 910 is transmitted to multiplexers 911 and 912 via bus 920. The information on bus 920 controls which of the flip-flops multiplexers 911 and 912 will store data into. The data on conductor 906 is steered to the data input of the selected flip-flop by multiplexer 911 and the clock signal for that flip-flop is supplied by multiplexer 912. Delay element 913 delays the clock signal by a sufficient amount of time for multiplexers 911 and 912 to perform the appropriate steering function and for the data to be present at the data input of the selected flip-flop for the required data setup time. After this delay period, the clock pulse is then used to clock the appropriate flip-flop via multiplexer 912.

Data is extracted from flip-flops 914, 915, and 916 in a similar manner except that data selector 917 is controlled by the output of counter 918 which is clocked by the clock signals received via conductor 211 from switch node 202-5.

It is to be understood that the above-described embodiment is merely illustrative of the principles of the inventon and that other arrangements may be devised by those skilled in the art without departing from the spirit and the scope of the invention.

What is claimed is:

1. A packet switching network for communicating packets from network input ports to network output ports and each of said packets comprising routing information, said network comprising:
   a plurality of stages each comprising a plurality of switch nodes;
   said plurality of stages interconnected by a plurality of interstage links;
   each of said switch nodes comprising a plurality of input means and output means;
   each of said switch nodes further comprises a plurality of intra-node links;
   each input means of each of said switch nodes interconnected by a set of said intra-node links to all of the output means of the same switch node;
   each output means of each switch node of an upstream stage interconnected via one of said plurality of interstage links to an individual input means of a switch node of a downstream stage;
   one of said input means of a switch node of a downstream stage comprising means for generating packet clock signals for transmission to the output means of a switch node of the upstream stage via the interstage link upon said one of said input means having present capacity to receive a packet;
   one of said output means of said switch node of said upstream stage responsive to receipt of said packet clock signals for transferring one of said packets to said one of said input means of said switch node of said downstream stage; and
   said one of said output means of said switch node of said upstream stage comprises means responsive to the receipt of said packet clock signals from said one of said input means of said switch node of said downstream stage within a predefined amount of time following the end of transmission of said one of said packets for transmitting error information.

2. The network of claim 1 wherein one of said input means comprises means responsive to the end of transmission of said one of said packets for timing for said predefined amount of time before retransmitting said packet clock signals thereby indicating the reception of said one of said packets.

3. The network of claim 1 wherein said one of said input means of said switch node of said downstream stage further comprises means responsive to a system reset signal for generating said packet clock signals; and
   said one of said output means of said switch node of said upstream stage further comprises means in response to said system reset signal for generating said error information upon receipt of said packet clock signals not being received and the elapse of said predefined amount of time.

4. The network of claim 2 wherein said one of said output means of said switch node of said upstream stage comprises means responsive to packet clock signals and system clock signals for synchronizing the transfer of said one of said packets from said one of said output means of said switch node of said upstream stage to said one of said input means of said switch node of said downstream stage via said interconnecting link.

5. The network of claim 4 wherein said synchronizing means comprises means for individually storing data of said one of said packets;
   means responsive to said system clock signals for sequentially directing said data of said one of said packets into individual ones of said storing means;
   means responsive to said packet clock signals for sequentially reading the stored data of said one of said packets from said individual ones of said storing means in a different sequence than that used by said directing means in storing into said individual ones of said storing means; and
   means responsive to the read data of said one of said packets for transferring the latter data to said one of said input means of said switch node of said downstream stage via said interconnecting interstage link.

6. The network of claim 5 wherein said directing means comprises means responsive to said system clock signals for counting by modulo 3; and means responsive to the contents of said counting means for sequentially multiplexing said data of said one of said packets into individual ones of said storing means.

7. The system of claim 6 wherein said packet data comprises bits and said individual ones of said storing means are flip-flops comprising means for storing one bit of data of said one of said packets upon receipt of a flip-flop clock signal at a clock input terminal.

8. The network of claim 7 wherein said directing means further comprises another means for multiplexing said system clock signals to individual ones of said flip-flop clock input terminals as said flip-flop clock signals thereby causing said individual flip-flops to store said bits of said packet data of said one of said packets.

9. The network of claim 8 wherein said reading means comprises another means for counting by modulo 3 in response to said packet clock signals; and means for data selecting the contents of said flip-flops in response to the contents of said other counting means in a different sequence than that used by said directing means in storing said bits of said packet data of said one of said packets into said flip-flops.

10. A switch node for utilization in a packet switching network having a plurality of stages with each of said stages interconnected to an upstream stage by a first plurality of interstage links and to a downstream stage by a second plurality of interstage links and each stage comprising a plurality of said switch nodes for the communication of packets and, each of said plurality of said switch nodes interconnected to said upstream stage by a set of said first plurality of interstage links and to said downstream stage by a set of said second plurality of interstage links, and said switch node comprising:

a plurality of input means for receiving packets from an upstream stage of said network via the set of said first plurality of interstage links;

a plurality of output means for communicating packets from said switch node to a downstream stage via the set of said second plurality of interstage links;

a plurality of intra-node links;

each input means interconnected by a set of said intra-node links to all of said output means;

one of said input means comprises means responsive to the present capacity of said one of said input means to receive a packet for generating a present capacity signal;

means responsive to the generation of said present capacity signal for transmitting packet clocking signals from said one of said input means to said upstream stage on one link of said set of said first plurality of interstage links;

means responsive to one of said packets from said upstream stage for storing said one of said packets;

means further responsive to the storing of said one of said packets for requesting via one of said intranode links the transfer of said one of said packets by said one of said output means to downstream stage via one link of said set of said second plurality of interstage links; and said one of said output means controlled by the transfer request and receipt of the packet clock signals from said downstream stage via said one link of said set of said second plurality of interstage links to communicate said one of said packets to said downstream stage via said one link of said set of said second plurality of interstage links.

11. The switch node of claim 10 wherein said one of said input means further comprises means responsive to the end of transmission of one of said packets from said upstream stage to cease transmitting said packet clock signals for a predefined amount of time thereby allowing said upstream stage to verify the correct operation of said one of said input means.

12. The switch node of claim 11 wherein said one of said output means further comprises means responsive to the end of transmission of said one of said packets to said downstream stage for generating an error signal upon receipt of said clock signals before said predefined amount of time elapsing.

13. The switch node of claim 10 wherein said one of said input means further comprises means responsive to a system reset signal for immediately transmitting said packet clock signals to said upstream stage.

14. The switch node of claim 13 wherein said one of said output means further comprises means responsive to said system reset signal for generating said error signal upon said packet clock signals not being received from said downstream stage within said predefined amount of time.

15. The output means of claim 12 further comprises means responsive to system clock signals and said packet clocking signals from said downstream stage for synchronizing the communication of said one of said packets from said one of said output means to said downstream stage.

16. The switch node of claim 13 wherein said rest means comprises first means responsive to said system clock signals for counting by modulo 3;

means for individually storing data of said one of said packets;

means responsive to said contents of said first counting means for sequentially directing said data of said one of said packets into individual ones of said storing means;

second means for counting by modulo 3 in response to said packet clock signals;

means responsive to contents of said second counting means for sequentially reading data of said one of said packets from individual ones of said storing means in a different sequence than that used by said directing means in storing into said individual ones of said storing means; and means responsive to the read data of said one of said packets for transferring said read data to said downstream stage.

17. The switch node of claim 16 wherein said individual ones of said storing means comprise flip-flops each having a data input and clock input terminals and responsive to a signal on said clock input terminal to store the bit present at said data input terminal;

said data of said one of said packet comprises a plurality of data bits;

said directing means comprises means for multiplexing said data bits to individual ones of said flip-flops in response to the contents of said first counting means;

another means for multiplexing said system clock signals to the clock input terminal of individual ones of said flip-flops in response to said contents of said first counting means; and each of said individual flip-flops responsive to the receipt of one of said system clock signals for storing one of said data bits.

18. Error checking and control facilities for switch nodes of a packet switching network for the communication of packets and each of said nodes comprising a plurality of input means for receiving packets from an upstream one of said switch nodes and a plurality of output means for communicating packets from the switch node to a downstream switch node, said facilities comprising:

means in a downstream switch node responsive to one of said input means having the present capacity for receiving a packet for transmitting packet clocking signals from said one of said input means to an upstream node;

one of said output means in said upstream switch node comprising means for internally storing one of said packets;

first means for counting by module 3 in response to system clock signals;

a set of flip-flops to temporarily retain packet data of said one of said packets;

means responsive to said system clock signals for storing said one of said packets from said internal storing means into said set of flip-flops under the direction of the contents of said module 3 counting means;

second means for counting by module 3 in response to said packet clock signals from said one of said input means;

means responsive to said second module 3 counting means for sequentially reading the packet data from said set of said flip-flops for transfer to said one of said input means of said downstream switch node;

said one of said downstream switch nodes further comprises another internal storing means for storing the transferred packet data;

means responsive to the end of transmission of said packet data for ceasing to transmit said packet clock signals to said upstream switch node;

said upstream switch node further comprises means responsive to the end of transmission of said packet data for timing for a predefined period of time; and means responsive to said timing for generating an error signal upon said packet clocking signals being received during the entire length of said predefined time period.

19. A method of switching packets by a switching network having switching stages each comprising a plurality of switch nodes and each of said packets comprising address routing information and each of said switch nodes comprising a plurality of input means and output means and a plurality of links each interconnecting an individual output means of a switch node of an upstream stage to an individual input means of a switch node of a downstream stage, comprising the steps of:

generating packet clock signals by one of said input means of the downstream stage for transmission to the output means of the upstream switch node via the interconnecting link upon said one of said input means having present capacity to receive one of said packets;

transferring said one of said packets in response to said packet clock signals by said upstream switch node to said downstream switch node;

timing for a predefined amount of time after the end of transmission of said one of said packet by said upstream switch node; and transmitting error information by said upstream switch node in response to receipt of said packet clock signals from said downstream switch node within said predefined amount of time.

20. The method of claim 19 further comprises the step of retransmitting said packet clock signals by said one of said input means to said upstream switch node upon said predefined amount of time having elapsed.

21. The method of claim 20 further comprises the steps of:

regenerating said packet clock signals by said one of said downstream input means upon receipt of a system reset signal; and retransmitting said error information by said upstream output means upon the elapse of said predefined amount of time and said system reset signal in absence of said packet clock signals.

* * * * *

UNITED STATES PATENT AND TRADEMARK OFFICE
CERTIFICATE OF CORRECTION

PATENT NO. : 4,670,871

DATED : June 2, 1987

INVENTOR(S) : Avinash K. Vaidya

It is certified that error appears in the above-identified patent and that said Letters Patent is hereby corrected as shown below:

Column 12, line 36, "rest" should be --reset--.

Signed and Sealed this

Eighteenth Day of August, 1992

*Attest:*

DOUGLAS B. COMER

*Attesting Officer*     Acting Commissioner of Patents and Trademarks